US005078937A

United States Patent [19]

Eela

[11] Patent Number: 5,078,937

[45] Date of Patent: Jan. 7, 1992

[54] METHOD AND SYSTEM FOR PRODUCING SLAB-FORMED MATERIAL BLANKS

[75] Inventor: Harri Eela, Kotka, Finland

[73] Assignee: Rauma-Repola Oy, Valko, Finland

[21] Appl. No.: 549,946

[22] Filed: Jul. 9, 1990

[30] Foreign Application Priority Data

Jun. 8, 1990 [FI] Finland ................................. 902892

[51] Int. Cl.[5] ............................................ B29C 31/02

[52] U.S. Cl. .................................... 264/109; 264/113; 264/333; 425/130; 425/447; 425/449

[58] Field of Search ............... 264/109, 113, 333, 112; 425/80.1, 81.1, 130, 447, 449; 156/39, 346

[56] References Cited

U.S. PATENT DOCUMENTS 2,737,997 3/1956 Himmelheber et al. ............ 264/112
3,611,482 10/1971 Hutz .................................. 425/130
3,873,662 3/1975 Cartlidge et al. .................. 264/113
4,247,497 1/1981 Wolf .................................. 264/40.4
4,369,025 1/1983 von der Weid ..................... 425/115
4,432,714 2/1984 Forry et al. ........................ 425/83.1
4,942,003 7/1990 Bold .................................. 264/40.4

*Primary Examiner*—Mary Lynn Theisen

[57] ABSTRACT

A method for producing a blank of a slab-like product, in which method a fibrous material such as chips or the like is mixed with a binder material such glue, cement or the like, and the mixture is fed into a blank-forming apparatus. The method is implemented by feeding the mixture of fibrous and binder materials from the blank-forming apparatus to a conveyor or similar platform in order to form a blank, after which one or more layers of blank-separating material is dispersed layer by layer onto the blank, and finally a second blank is laid onto the layers of blank-separating material.

10 Claims, 5 Drawing Sheets

METHOD AND SYSTEM FOR PRODUCING SLAB-FORMED MATERIAL BLANKS

FIELD OF THE INVENTION

The present invention concerns a method and an apparatus for producing a slab-formed material blank, in which method fibrous material such as chips and the like is mixed with a binder material such as a glue or cement and routed to a forming apparatus of the blank.

DESCRIPTION OF THE BACKGROUND ART

Manufacture of chipboard products, for instance, makes use of dispersal of material in the preparation of a blank, whereby a mix of chips and binder is fed, e.g., onto a conveyor band or into a mould in order to form a blank. The blank is cut and transferred to a platen press, where the blank containing chips and binder is pressed into a chipboard. When using a platen press for the manufacture of a chipboard product, planar products only can be fabricated without resorting to a mould. The gap of a platen press is capable of producing only one sheet product at a time. The manufacture of nonplanar products with nonrectangular cross-sections necessitates the use of moulds, which contributes to higher costs.

An example of a nonplanar product is a wedge-shaped roofing shingle. The traditional art of making shingles is based on manual cleavage of wood using an axe. This procedure is laborious and, moreover, the fire safety of wooden shingles is substandard. Wedge-shaped roofing shingles have been manufactured by moulding from a cement-glued chipboard offering an improved fire safety over that of wooden shingles. The moulds used in the so-called "wet" method are costly. Due to the increased product weight, weight-reducing aggregates are necessary resulting in a worsened product strength. Furthermore, the "wet" method causes wastewater problems.

A roofing shingle or similar wedge-shaped product can be produced from a thick blank by sawing the blank into wedge-shaped forms. This results in high material losses and appreciable equipment and saw blade costs. Furthermore, a roofing shingle produced by sawing is inferior by appearance and quality.

SUMMARY OF THE INVENTION

The aim of the present invention is to achieve a method capable of avoiding the above-described drawbacks. The method in accordance with the invention is characterized by forming a mixture of fibrous and binder materials dispersed onto a conveyor into a blank, after which the upper surface of the blank is covered layer by layer with one or more layers of blank-separating material, and finally placing a second blank onto the newly laid blank-separating layers.

An advantageous embodiment of the invention is characterized by forming a combination blank with a rectangular cross-section from two or more superimposed blanks, each separated from the other by a layer of blank-separating material.

Another advantageous embodiment of the invention is characterized by feeding the mixture of fibrous and binder materials in a variable thickness along the cross-direction of the blank onto the conveyor or similar platform, whereby a blank having a nonrectangular cross-section can be formed.

A further advantageous embodiment of the invention is characterized by forming onto the conveyor or similar platform a combination blank having a rectangular cross-section and being comprised of two blanks, each separated from the other by a layer of blank-separating material, and at least one of the superimposed blanks having a non-rectangular cross-section.

A system suitable for the implementation of the method according to the invention, whereby the system is comprised of at least two blank-forming apparatuses, each being equipped with one or more rotating blank-shaping units whose surface of revolution carries dispersing elements and the underside of the apparatuses being equipped with a band conveyor, and of the band conveyor under the blank-forming apparatuses on which conveyor the blank is formed, is characterized by a noncylindrical surface of revolution in at least the last blank-shaping unit of the system at the conveyor band exit side, and that the profiles of surfaces of revolution in at least the last two blank-shaping units are mutually complementary, and that a dispersing unit of the blank-separating material is arranged between each two subsequent blank-forming apparatuses.

The prime benefits of the method in accordance with the invention include, for instance, improved blank-forming capacity by virtue of an at least two-fold increase in the press capacity through the use of the blank-separating material. Furthermore, the method in accordance with the invention achieves sheet products with non-rectangular cross-sections in a platen press without the use of costly moulds. Moreover, the method eases the pressing of a product having a rectangular cross-section. Finally, the planar product is much easier to handle, saw, package and store.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the following, the invention will be examined in more detail with reference to the attached drawing which are given by way of illustration only, and thus are not limitative of the present invention, and in which.

DETAILED DESCRIPTION OF THE PREFERRED EMBODIMENTS

Figure 1:
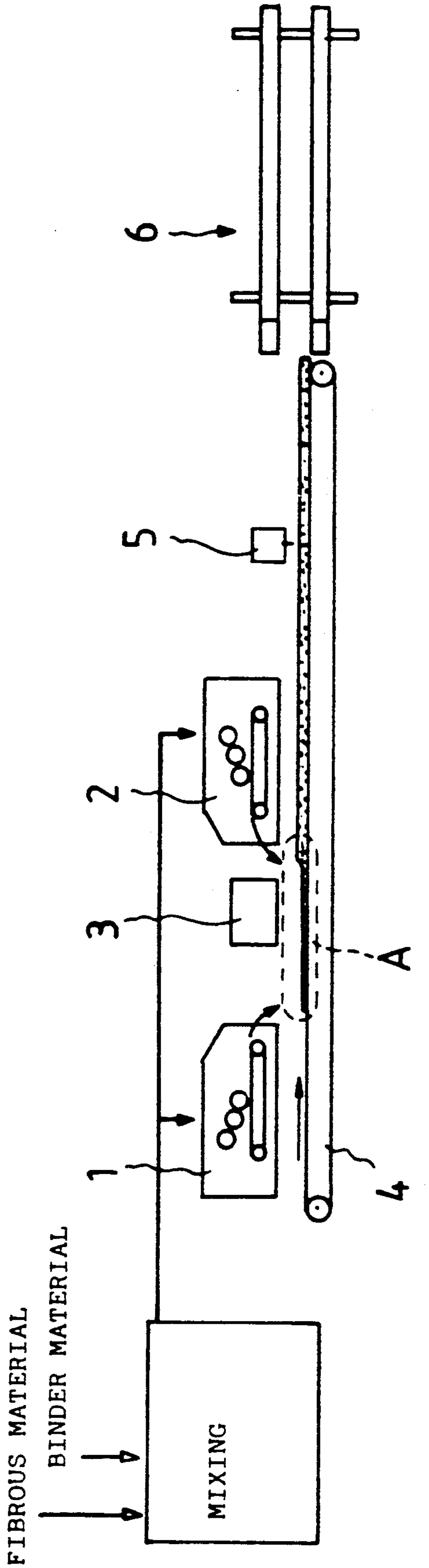
FIG. 1 shows diagrammatically a method in accordance with the invention for fabricating a slab-like product blank.

FIG. 1 illustrates diagrammatically the production method according to the invention for fabricating a slab-like blank. During the first stage, a fibrous material such as chips or the like is mixed with a binder material. The binder material can be any of different kinds of glues, cement or gypsum. The mixture of fibrous and binder materials is brought by means of, for instance, a conveyor (not shown) to a blank-forming apparatus 1, 2. Illustrated in FIG. 1 are two blank-forming apparatuses 1, 2 and a dispersing unit 3 of the blank-separating material. Underneath the blank-forming apparatuses is arranged a band conveyor 4 on which the blank is formed to have a desired cross-sectional profile by dispersion from the blank-forming apparatus 1, 2. The transport direction of the band conveyor 4 is designated by an arrow in the diagram. The blank is transferred by means of the band conveyor 4 to a cutting unit 5, wherein the blank is cut to desired lengths for pressing. From the cutting unit the ready-cut blank is transferred by means of the band conveyor 4 to a platen press 6, where the blank is pressed. During the pressing stage, the co-effect of the binder material and the imposed force of pressing results in a slab-like blank. It must be mentioned that the blank-separating material remains intact during the pressing. Thus, the pressed slab-like combination blank can be separated into two individual blanks along the layer of blank-separating material. The pressed combination blank can be pretrimmed to desired dimensions, thereby permitting the separation of the pressed blank into individual blanks first after the pressing.

Figure 2:
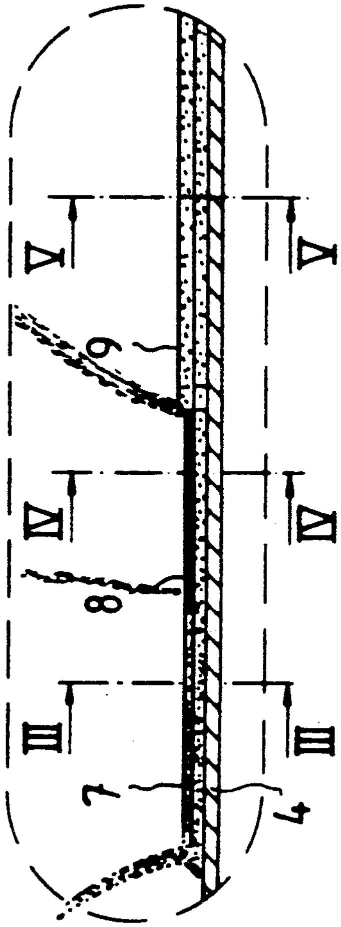
FIG. 2 shows detail A of FIG. 1 in an enlarged scale.
Figure 3:
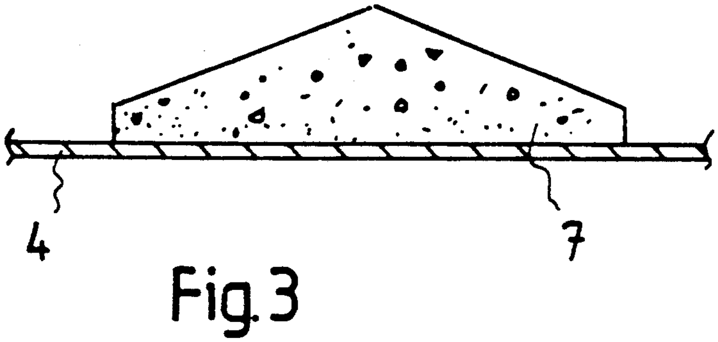
FIG. 3 shows section III—III of FIG. 2 in an enlarged scale (with exaggerated dimensions for clarity)
Figure 4:
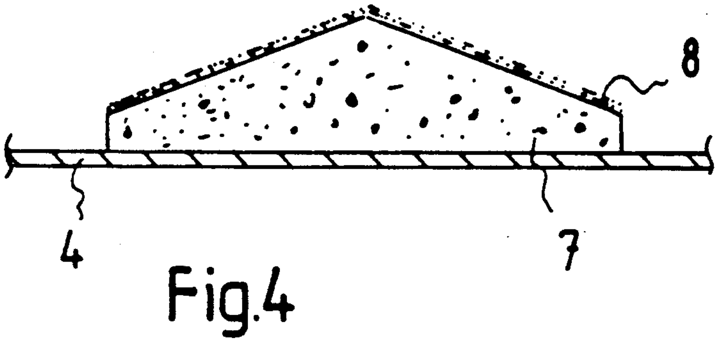
FIG. 4 shows section IV—IV of FIG. 2 in an enlarged scale (with exaggerated dimensions for clarity)
Figure 5:
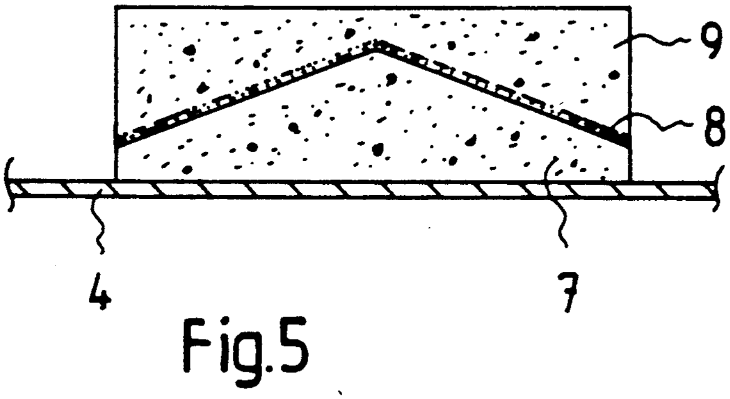
FIG. 5 shows section V—V of FIG. 2 in an enlarged scale (with exaggerated dimensions for clarity).

FIG. 2 shows detail A of FIG. 1 in an enlarged scale, thus optimally illustrating the function of the method. A blank 7 is produced by dispersion onto a conveyor 4 by means of the blank-forming apparatus 1. A possible shape of the blank 7 is shown in FIG. 3. The cross-section of the illustrated blank 6 is non-rectangular and achieved by means of the blank-forming apparatus 1. The next stage of the method is illustrated in FIG. 4, whereby a layer 8 of blank-separating material is dispersed onto the blank 7 by means of a dispersion unit 3 of the blank-separating material. Illustrated in FIG. 5 is the next stage of the method, whereby a second blank 9 produced by a second blank-forming apparatus 2 is laid onto the layer 8 of the blank-separating material so that the upper layer of the upper blank 9 becomes flat. It must be mentioned that the dimensions in FIGS. 3 . . . 5 are exaggerated in the interest of clarity. Finally, the rectangular combination blank formed from two blanks 7 and 9 as well as of the layer 8 of the blank-separating material is transferred by the conveyor 4 to a cutting unit and final pressing in order to be pressed into a blank of a slab-like product.

Figure 6:
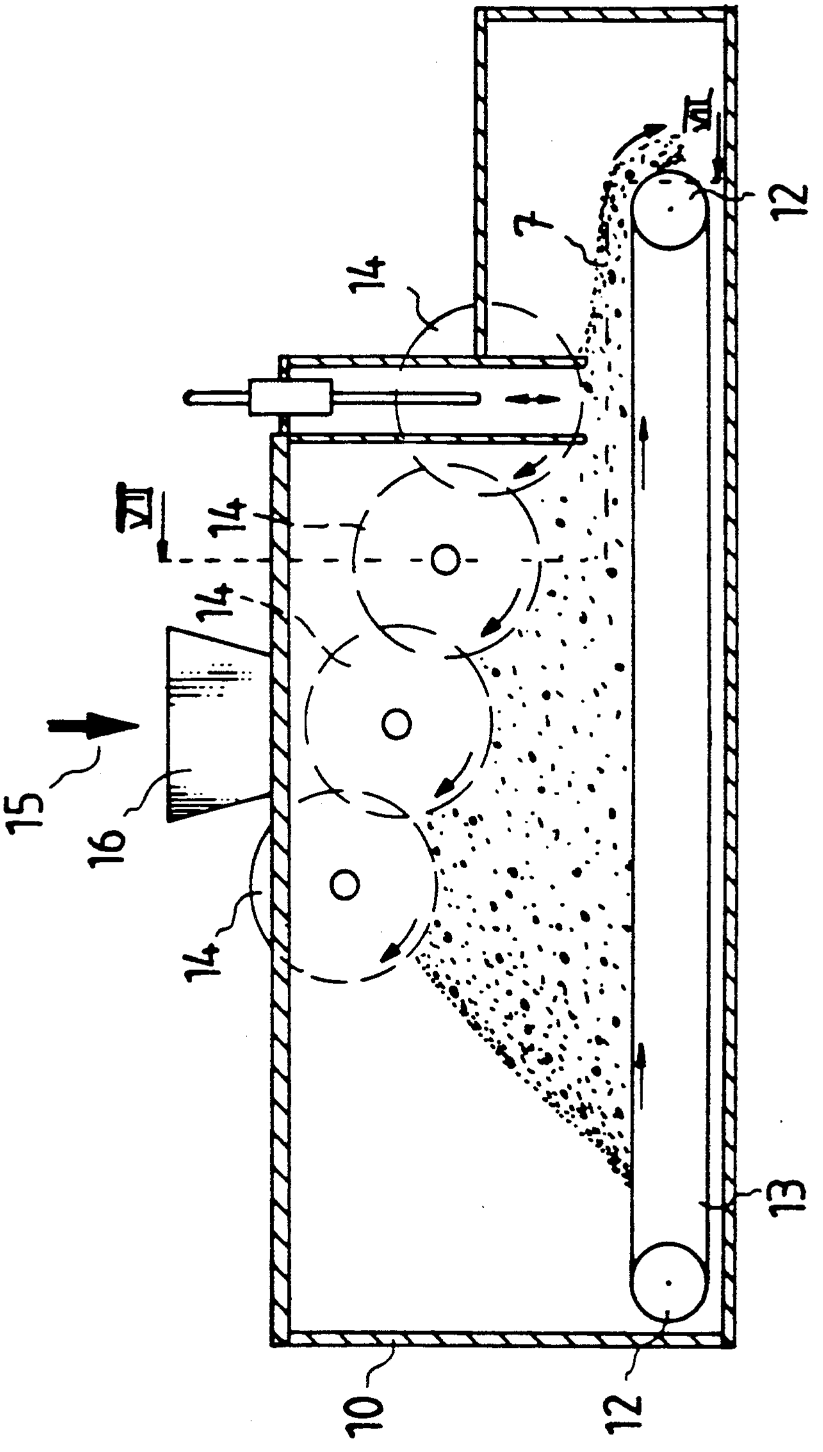
FIG. 6 shows a blank-forming apparatus in accordance with the invention in a side view.

The blank-forming apparatus 1 is shown in FIG. 6. The apparatus comprises a frame structure 10, which encloses a band conveyor 13 routed around two rollers 12 as designated by arrows indicating the travel direction of the band. Above the band conveyor there are placed several rotating blank-shaping units 14, whose number can be four, for instance. The rotational direction of the blank-shaping units is designated by arrows and is identical to the travel direction of the band conveyor 13. The last one of these blank-shaping units at the exit end of the band conveyor, which unit also is the lowermost, is arranged adjustable in the vertical direction. This arrangement makes it possible to control the material flow rate (that is, blank thickness) of the blank 7 passing between the band conveyor 13 and said last blank-shaping unit 14.

Feed of the fibrous material mixture into the blank-forming apparatus takes place in the manner indicated by arrow 15 using, for instance, a conveyor feeding the material into a hopper 16, from where the fibrous material mixture falls onto the blank-shaping units 14 and therefrom further onto the band conveyor 13. The hopper 16 acts as material divider so that areas intended to form an a thicker profile in the cross-section of the blank are fed heavier with the fibrous material mix than the other areas. This desirable effect is achieved by means of adjusting the chute shape of the hopper 16 in the cross-direction of the apparatus.

Figure 7:
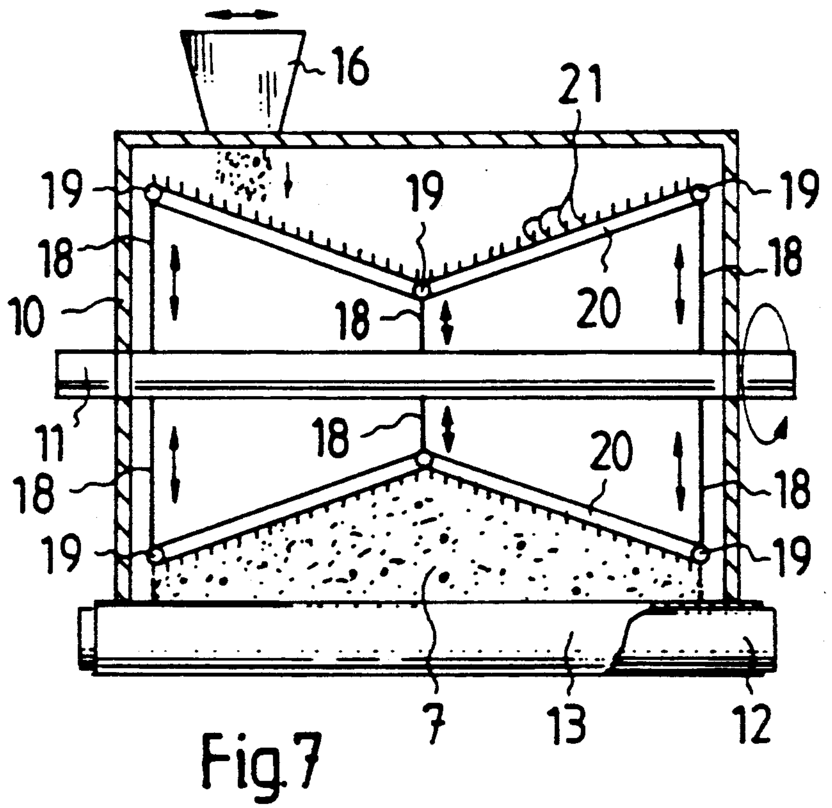
FIG. 7 shows the blank-forming apparatus in accordance with the invention illustrated in FIG. 6 in sectional view along line VII—VII.
Figure 8:
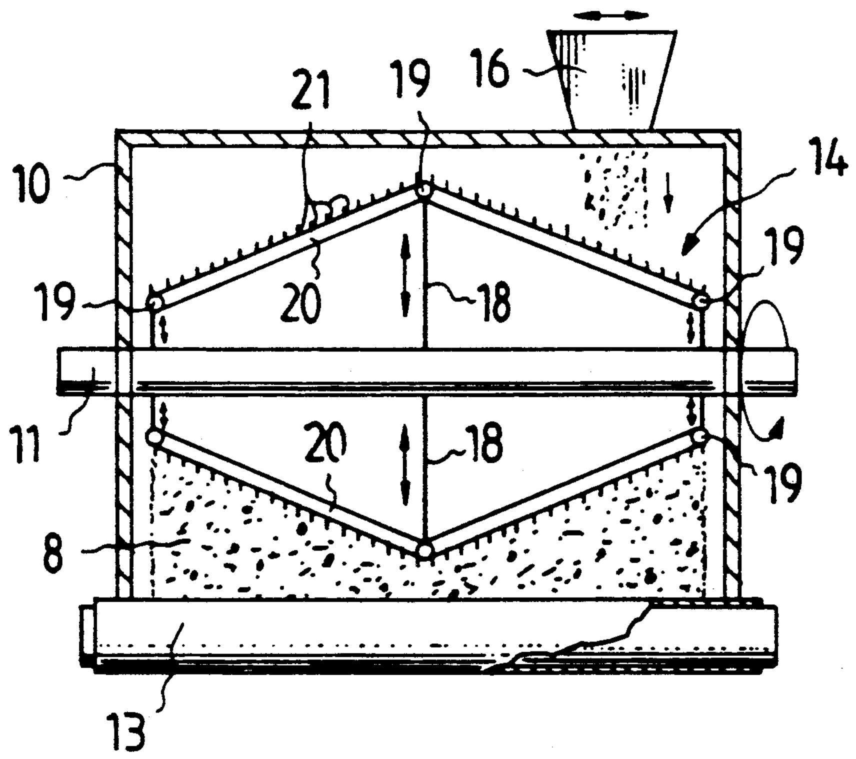
FIG. 8 shows another blank-forming apparatus in accordance with the invention in a sectional view.

The profile of the surface of revolution in the blank-shaping units 14 of the blank-forming apparatus 1 determines the cross-sectional profile of the blank 7. The blank-shaping units 14 can be constructed using leveling rollers or studded rollers with a desired profile of surface of revolution, or alternatively, using such shaping elements of the studded roller type with an adjustable profile of surface of revolution as shown in FIGS. 7 and 8.

The adjustable blank-shaping units 7 comprise a drive shaft 11 pivotally mounted on bearings to a frame 10 and driven by an electric drive motor (not shown). The drive motor and the drive shaft are mutually connected via a speed reduction unit by conventional means. The drive shaft 11 is adapted to carry lengthwise adjustable support members 18, which are mounted essentially perpendicularly to the shaft. To the support members 18, via articulated joints 19, there are adapted arms 20 which connect the adjacent support members 18 to each other. The arms 20 are adapted to carry stud-like material-dispersing members 21, whose length is adjustable. The arms 20 are adjustable by means of the support members 18. Each blank-shaping roller 14 incorporates one or more arms 20, preferably two arms evenly spaced and attached to the circumference of the drive shaft 11 via the support members 18. This arrangement spaces the arms by 180° on the circumference of the drive shaft. An advantageous cross-sectional profile of the blank 7 for fabricating, e.g., roofing tiles, is achieved by way of using an arm 20, which has an articulated joint 19 both at the ends and center of the arm 20. The shape of the arm 20 is adjusted with the help of the support members 18 so as to achieve a desired cross-sectional profile of the blank 7, which is produced from the mixture of fibrous and binder materials travelling on the band conveyor 13 and therein is shaped by the arm 20 and the studs 21 mounted on the arm as the material is transported on the band conveyor 13 under the blank-shaping units 14. The adjustment of the feeder hopper 16 and the blank-shaping units 14 achieves a desired shape of the blank.

The blank 7 shaped to a desired cross-section profile is next transferred by, for instance, dropping the blank from the band conveyor 13 to a transfer platform 4. The blank 7 is subjected during the dropping to a gentle air jet which effects the detachment of lighter particles making them fly farther away onto the band of the conveyor 4. Such an arrangement allows the lighter particles to settle on the surface of conveyor band. Obviously, the use of the air jet results in a smoother surface of the final product.

Next, the blank 7 transferred onto the conveyor 4 in a desired shape is coated with a layer 14 of blank-separating material. The material of the blank-separating layer can be, e.g., paper, chips, waste material from the production line or similar. An essential requirement of material of the blank-separating layer is that it must not react with the blanks 7, 9 above and below the material layer during the pressing of the combination of blanks. The layer of blank-separating material is dispersed evenly so that a layer 8 of essentially constant thickness on the surface of the blank 7 is achieved, irrespective of the cross-sectional profile of the blank. The dispersion unit 3 of the blank-separating unit can have a construction identical or similar to the blank-forming apparatuses.

From a second blank-forming apparatus 2, onto the layer 8 of the blank-separating material, is dropped a second blank 9 with a desired cross-sectional shape. A preferred cross-sectional profile of the blank is such that is complementary to the profile of the blank 7 laying under the layer of the blank-separating material so that the superimposed blanks together form a combination blank having a rectangular cross-section.

The second blank-forming apparatus of the blank 9 is shown in FIG. 8. According to the diagram, the blank-shaping units of the apparatus are adjusted so as to shape the blank 7 into such an upper blank 9 that has an essentially complementary cross-sectional profile to that of the blank 8 formed by the first blank-forming apparatus.

The resultant slab-like blank, having a rectangular cross-section which is formed from the two blanks 7, 9 with the intermediate layer 8 of blank-separating material, is cut, and the blank is next on the conveyor 4 transferred to the press 6. Advantageously, the press 6 is a platen press or a multiple platen press. In the press, the blank is pressed until sufficiently set to retain its shape.

Figure 9:
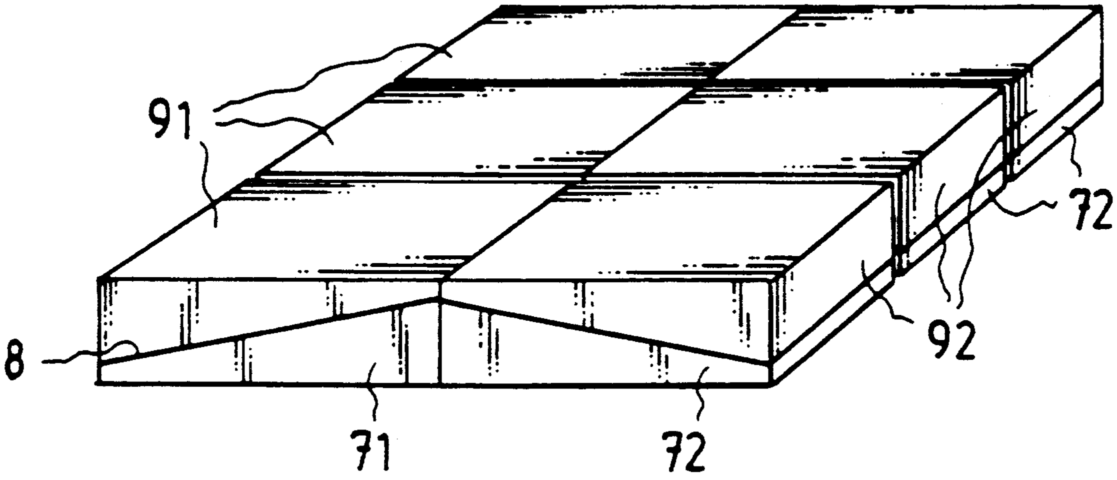
FIG. 9 shows the sawing plan of a pressed chipboard product fabricated using the method in accordance with the invention.

Next, the pressed slab-like blank is removed from the press. The blank is transferred and trimmed to final dimensions and stored for final curing. An advantageous plan of sawing is shown in FIG. 9. According to the plan, the slab-like blank is sawn first longitudinally at the center and then into smaller pieces of desired shape. Thus, each sawn piece is divided into two wedge-shaped slab-like products 71, 91 and 72, 92. The layer 8 of blank-separating material is retained between the superimposed blanks. So, a combination blank of two superimposed blanks according to the exemplifying embodiment provides four wedge-shaped blanks of the final product The product is delivered to the customer, who finally detaches the wedge-shaped products from each other along the layer 8 of blank-separating material and mounts them. The warehousing and transport of the product is advantageously handled keeping the products in the super-imposed, slab-like form of rectangular cross-section.

Figure 10:
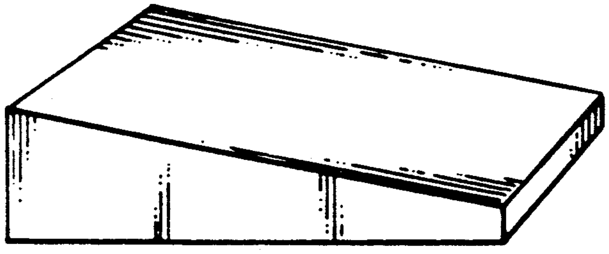
FIG. 10 shows a wedge-shaped chipboard product fabricated using the method in accordance with the invention.

Illustrated in FIG. 10 is a shape-trimmed, wedge-shaped slab-like product such as, for instance, a roofing shingle which is produced according to the method and using the apparatus in accordance with the invention. At the final stage of pressing, the surface of the product can additionally be provided with a desired embossing.

For those versed in the art, it is obvious that the invention is not limited to the exemplifying embodiments described above; by contrast, the invention can be varied within the claims disclosed herein. Thence, it is possible to have two or more blanks in the combination blank to be pressed, each separated from the other by a layer of blank-separating material. Further, the width and shape of the blanks can have unlimited forms determined only by the variability of the surface of revolution of the blank-shaping unit.

What is claimed is:

1. A method for producing a blank of a slab-like product comprising the steps of:

mixing a fibrous material with a binder material;

feeding the mixture from the blank-forming apparatus to a conveyor to form a first blank;

dispersing at least one layer of blank-separating material on the first blank on the conveyor;

feeding the mixture of fibrous material and binder material onto the at least one layer of blank-separating material on the first blank on the conveyor to form a second blank; and separating the first blank from the second blank along that at least one layer of blank-separating material to form at least two individual blanks.

2. The method as claimed in claim 1, wherein the at least two individual blanks formed by the step of separating each have a rectangular cross-section and wherein the first blank is positioned below the second blank with the at least one layer of blank-separating material thereinbetween before the step of separating.

3. The method as claimed in claim 1, wherein the steps of feeding the mixture to form the first and second blanks further comprise feeding the mixture of fibrous material and binder material in a variable thickness along a cross-direction of the blanks whereby the first and second blanks have nonrectangular cross-sections.

4. The method as claimed in claim 1, wherein at least one of the steps of feeding the mixture to form the first and second blanks results in at least one of the first and second blanks having a nonrectangular cross-section.

5. The method as claimed in claim 1, further comprising the step of using one of chips, waste material of chipboard manufacture and paper as the blank-separating material.

6. The method as claimed in claim 1, wherein the steps of feeding the mixture to form the first and second blanks further comprise the steps of dispersing the mixture.

7. The method as claimed in claim 1, further comprising the steps of using chips as the fibrous material and of using one o glue and cement as the binder material.

8. A system for producing a slab-like product blank, said system comprising at least two blank-forming apparatuses, each apparatus being equipped with at least one rotating blank-shaping unit having a surface of rotation carrying dispersing elements and an underside of the apparatuses being equipped with a conveyor for forwardly transferring a mixture of fibrous material and binder material, the system further comprising a blank-carrying platform under each of the blank-forming apparatuses and a dispersion unit between the blank-forming apparatuses, the blank-carrying platform receiving the mixture from a first apparatus then receiving blank-separating material from the dispersing unit and then receiving more mixture from a second apparatus whereby the blank-carrying platform has a first and second blank formed therein with the blank-separating material thereinbetween, the blank-carrying platform therefore having at least two blanks thereon which are separable at the blank-separating material to from at least two individual blanks, the blank shaping units having an adjustable surface of revolution.

9. The system as claimed in claim 8, wherein at least a last blank-shaping unit at an exit side of the conveyor of each apparatus has a non-cylindrical surface of revolution whereby blanks having nonrectangular cross-sections can be formed.

10. The system as claimed in claim 8, wherein the blank-shaping units comprises lenghtwise-adjustable support members generally perpendicular to a drive shaft and being attached to the shaft, said support members having ends thereof connected with articulated arms having at least one articulated joint to make the blank-shaping surface of revolution adjustable by means of the support members.

* * * * *